INVENTORS
ROBERT L. WORTHINGTON
FRANK J. THOMAS
ATTORNEY

Nov. 29, 1966  R. L. WORTHINGTON ETAL  3,289,193
MONITORING SYSTEM FOR REDUNDANT SYSTEMS
Filed Oct. 22, 1963  3 Sheets-Sheet 2

INVENTORS
ROBERT L. WORTHINGTON
FRANK J. THOMAS
BY *Herbert L. Davis*
ATTORNEY

Nov. 29, 1966   R. L. WORTHINGTON ET AL   3,289,193
MONITORING SYSTEM FOR REDUNDANT SYSTEMS
Filed Oct. 22, 1963   3 Sheets-Sheet 3

INVENTORS
ROBERT L. WORTHINGTON
FRANK J. THOMAS
BY *Hubert L. Davis*
ATTORNEY

United States Patent Office 3,289,193
Patented Nov. 29, 1966

3,289,193
MONITORING SYSTEM FOR REDUNDANT SYSTEMS
Robert L. Worthington, East Orange, and Frank J. Thomas, West Paterson, N.J., assignors to The Bendix Corporation, Teterboro, N.J., a corporation of Delaware
Filed Oct. 22, 1963, Ser. No. 318,050
7 Claims. (Cl. 340—248)

This invention relates to improvements in a monitoring system for use in redundant systems of a type disclosed and claimed in a copending U.S. application Serial No. 314,397, filed October 7, 1963, by Harold Moreines, and assigned to The Bendix Corporation, assignee of the present invention, and more particularly to an off line monitor system.

In prior off line monitors for redundant systems, failure to the monitor cause deterioration of the data signal and the monitor is often limited as to its capability in detecting failures due to shorts, opens, out of tolerance amplitudes and out of time phase shifts.

This invention contemplates a system providing means for producing an output as a result of instantaneous differences in amplitude or phase in the input signals, memory means responsive to a change in the input signals, warning means signifying when an out of tolerance signal is detected and further means indicating second failures.

An object of the invention is to provide an off line monitor wherein any failure to the monitor itself will not deteriorate the data signal.

Another object of the invention is to provide an off line monitor capable of detecting failures due to shorts, opens, out of tolerance amplitudes and out of tolerance phase shifts.

An object of the invention is to provide an off line monitor which is fail safe and wherein any failure to the monitor will be displayed as a system failure.

A further object of the invention is to provide an off line monitor in which any passive or power supply failure is also displayed as a system failure.

The foregoing and other objects and advantages of the invention will appear more fully hereinafter from a consideration of the detailed description which follows taken together with the accompanying drawings wherein one embodiment of the invention is illustrated by way of example. It is to be understood, however, that the drawings are for the purpose of illustration only and are not to be construed as defining the limits of the invention.

Figure 5:
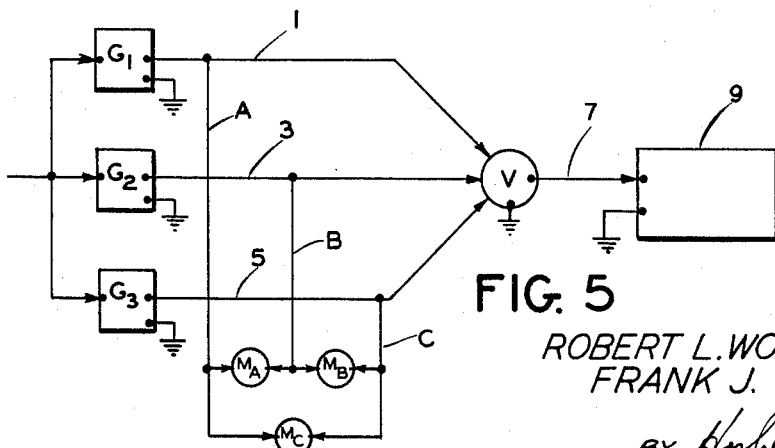
FIGURE 5 is a block diagram of a cross channel monitoring system embodying the off-line monitor of the present invention.

Referring to the drawing of FIGURE 5, the cross channel monitoring system embodies redundant equipment $G_1$, $G_2$, and $G_3$ having output lines 1, 3, and 5 operatively connected to a voter device V which may be of a type disclosed and claimed in the aforenoted copending U.S. application Serial No. 314,397, filed October 7, 1963, by Harold Moreines, and assigned to The Bendix Corporation, assignee of the present invention. The voter device V may have a main output line 7 connected to suitable equipment operated thereby and indicated by the numeral 9.

Figure 1:
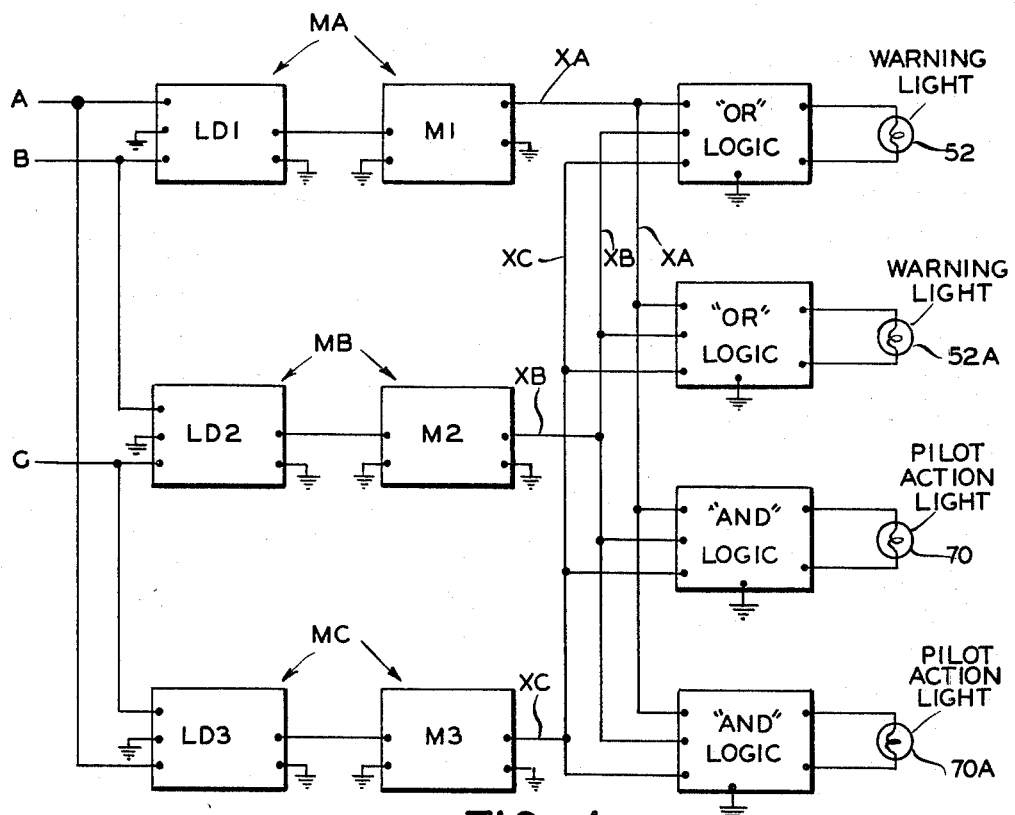
FIGURE 1 is a block diagram illustrating an off line monitor embodying the invention.

The off line monitor shown by block diagram in FIGURE 1 is operatively connected across the output lines 1, 3, and 5 by conductors A, B, and C, as shown in FIGURES 1 and 5. In the cross channel monitor of FIGURE 5, the three signals are compared differentially two by two to provide redundant failure data, since two of the three comparators MA, MB, and MC register each failure. Thus, in the event of single passive monitor failure, the monitor retains its capability to indicate subsequent system failure.

Referring to the block diagram in FIGURE 1, the off line monitor for the triple redundant system of FIGURE 5 includes three identical channels plus two redundant logic elements which control the warning and pilot action lights. Each channel consists of a level detector LD1, LD2, and LD3 and a memory unit M1, M2, and M3. The system requirements dictate that a warning light 52 or 52A be energized whenever a single failure occurs and a pilot action light 70 or 70A be energized whenever two failures occur. These requirements are obtained by comparing the three signals A, B, and C two by two and applying the outputs generated as a result of these comparisons to the logic elements. If the signals A, B, and C are applied to the input of the off line monitor, and signal A fails due to an open, short or is out of tolerance, level detector LD1 and level detector LD3 will have two different signals at their inputs resulting in a change of state in memory unit M1 and memory unit M3. Since the "Or" logic is satisfied whenever a memory unit changes state the warning light is energized upon one failure. The "And" logic function is not satisfied until all three memory units have changed state therefore the pilot light will not be energized until there is another failure.

Figure 2:
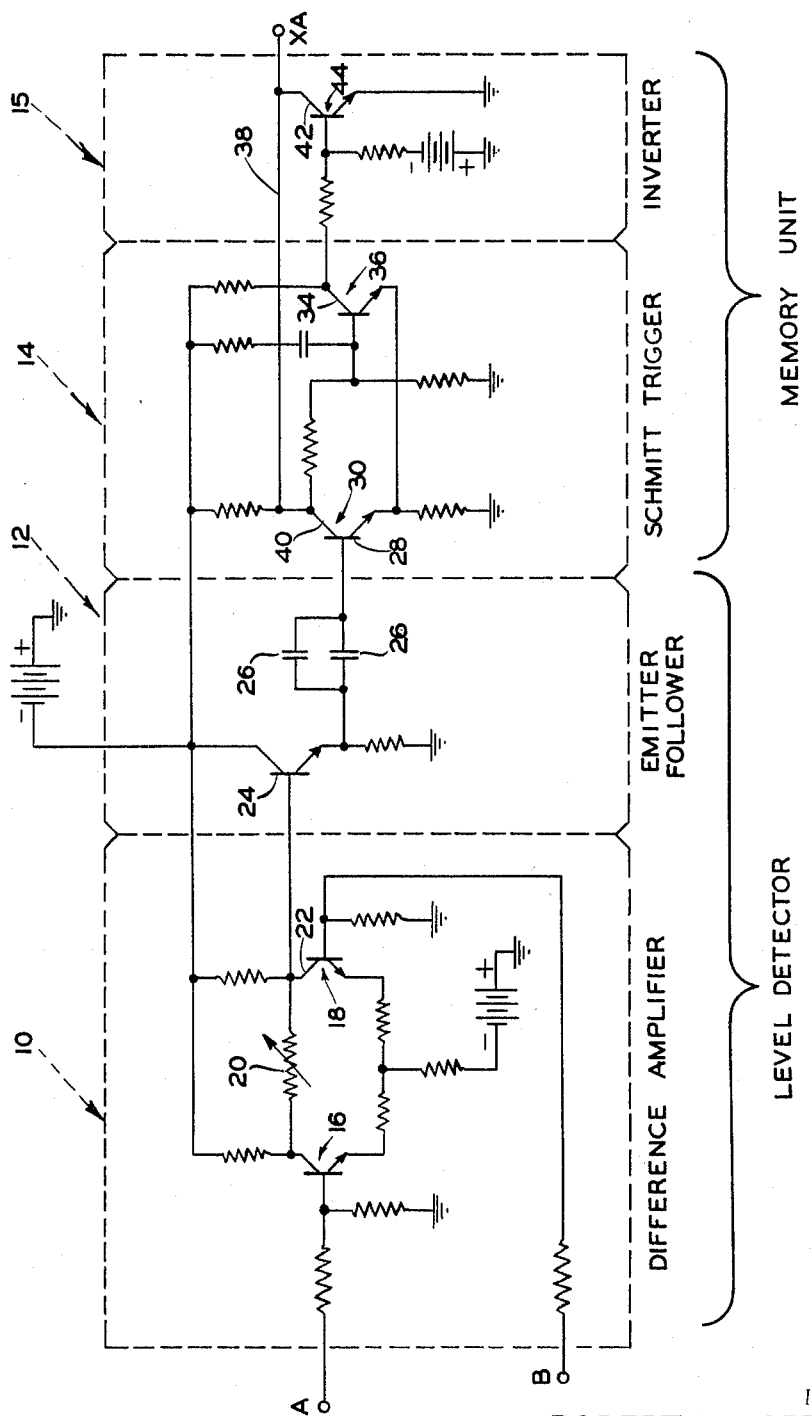
FIGURE 2 is a schematic wiring diagram of a level detector and memory circuit which may be embodied in the invention.

Referring to the drawing of FIG. 2, a level detector LD which may be embodied in the invention is shown as including a single ended difference amplifier 10 and an emitter following 12, while the memory unit M includes a Schmitt trigger 14 and inverter 15. The difference amplifier 10 provides an output proportional to the difference between two input signals applied at A and B. The emitter follower 12 in the circuit provides impedance matching. When the output from the difference amplifier 10 exceeds a predetermined voltage level the signal causes the Schmitt trigger 14 to fire producing a change in state of its output. The two signals to be compared are applied to the bases of the difference amplifier transistors 16 and 18. A variable resistor 20 is provided for adjusting the trigger level of the level detector 10. The difference amplifier 10 provides an output for instantaneous differences in input signals thus monitoring for phase as well as amplitude.

An output obtained from a collector 22 of transistor 18 is coupled by capacitors 26 in emitter follower 12 to the input of a Schmitt trigger base 28 of a transistor 30. The memory unit of the system is provided by latching the Schmitt trigger 14 with an inverter 15. The input of the inverter 15 is obtained from the collector 34 of transistor 36 of the Schmitt trigger 14, and the output line 38 of the inverter 15 is connected to the collector 40 of transistor 30. Transistor 36 is at the binary 0 level when the input of the Schmitt trigger 14 is below the triggering point and the collector 40 of transistor 30 and collector 42 of transistor 44 are at the binary 1 level. However, when the input to the Schmitt trigger 14 is increased beyond the triggering point of the Schmitt trigger 14 the Schmitt trigger 14 changes state causing transistor 36 to go to the binary 1 level while transistor 30 and transistor 44 go to the binary 0 level. Once the Schmitt trigger 14 is triggered even though the input is later reduced below the triggering point the circuit remains in the triggered state and remains latched until it is reset.

Figure 3:
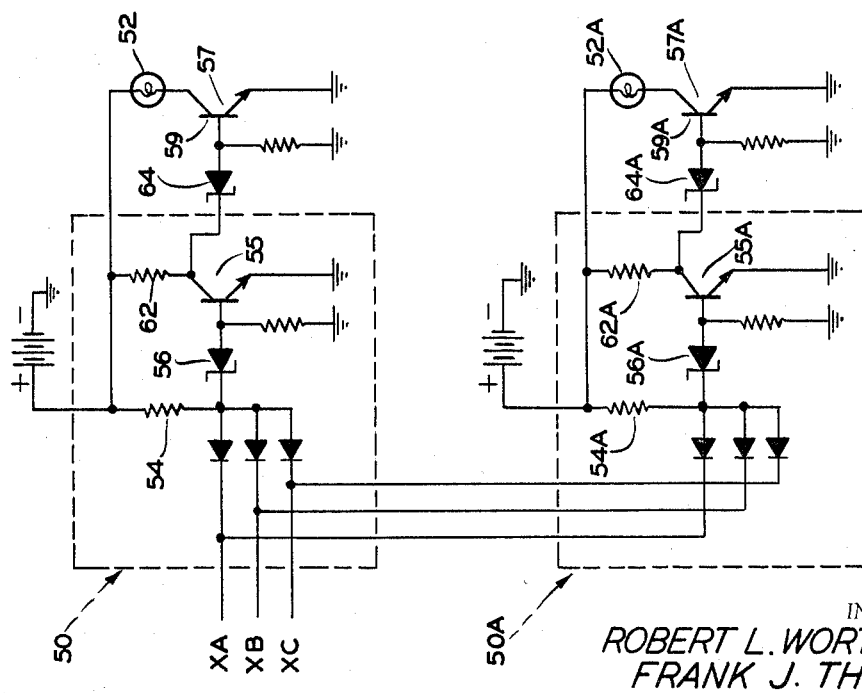
FIGURE 3 is a schematic wiring diagram of a warning light logic circuit which may be embodied in the invention.

Referring to FIG. 3 a multiple input NAND gate 50 may be used to provide the logic control for a warning light 52. When the input signals to the system are in tolerance the inputs to the NAND gate 50 are at the binary 1 level and the transistor 55 of the NAND gate 50 is saturated through a zener diode 56 and resistor 54. Since transistor 55 is saturated there is no base drive to transistor 57 therefore the warning light 52 remains off. But when an out of tolerance signal is detected, any two of the inputs XA, XB, and XC to the NAND gate 50 change to the binary 0 level. Transistor 55 is cut off and the drive to the base 59 of the transistor 57 is provided through resistor 62 and zener diode 64 to turn transistor 57 on.

Figure 4:
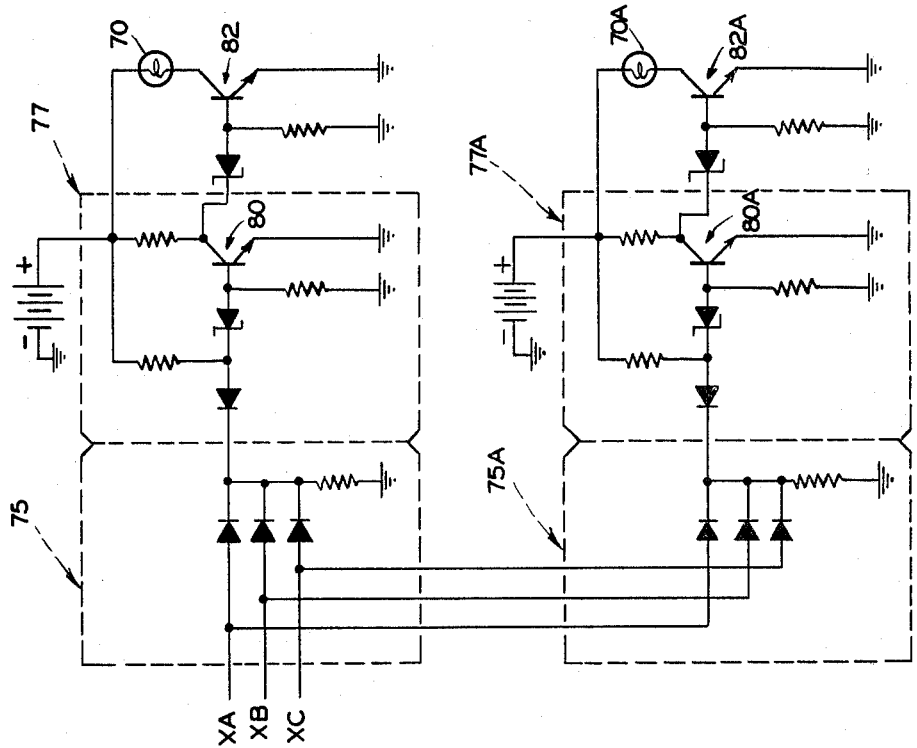
FIGURE 4 is a schematic wiring drawing of a pilot action logic circuit which may be embodied in the invention.

Referring to FIG. 4, the logic for the pilot action light 70 is provided by a series combination of an OR gate 75 and NAND gate 77. Initially all inputs XA, XB, and XC to the OR gate 75 are at the binary 1 level, transistor 80 is saturated, and transistor 82 is cut off. If a single failure occurs two inputs to the OR gate 75 change state but since the remaining input to the OR gate 75 is still present the NAND gate 77 remains qualified and transistor 80 and 82 thereof do not change state. However, when a second failure occurs the remaining input to the OR gate 75 also changes causing the NAND input to change transistor 80 to cut off and transistor 82 to saturate activating a pilot action light 70.

The logic circuitry of FIGURES 3 and 4 has also been made redundant insuring against failures in the logic circuitry in which corresponding parts are indicated by the numerals with the suffix A.

Although but a single embodiment of the invention has been illustrated and described in detail, it is to be expressly understood, that the invention is not limited thereto. The fan-in to the logic gates can be increased to handle multiple redundant elements and various other changes may also be made in the design and arrangement of the parts without departing from the spirit and scope of the invention as the same will now be understood by those skilled in the art.

What is claimed is:

1. A monitor system comprising an input for receiving a plurality of signals:
    plural means for producing output signals as a result of instantaneous differences in amplitude between pairs of the input signals;
    plural memory means responsive to a change in said output signals;
    means responsive to a change of state of any of said memory means for indicating an out of tolerance signal; and
    further means responsive to a change of state of all of the memory means for indicating the presence of more than one out of tolerance signal.

2. The combination defined by claim 1 wherein each of said plural means for producing output signals as a result of instantaneous differences in amplitude between pairs of the input signals includes:
    a single ended difference amplifier providing an output signal proportional to the difference between a pair of the input signals;
    an emitter follower providing impedance matching; and
    each of the plural memory means including a Schmitt trigger having an input operatively connected through the emitter follower to the output of the difference amplifier and effective for producing a change in a controlled condition when its input exceeds a predetermined voltage level.

3. The combination defined by claim 1 wherein each of said plural memory means responsive to a change in said output signals includes:
    an inverter for latching the means for producing an output signal as a result of an instantaneous difference in amplitude between pairs of the input signals.

4. The combination defined by claim 1 wherein said means responsive to a change of state of any of said memory means for indicating an out of tolerance signal includes a multiple input NAND gate.

5. The combination defined by claim 1 wherein said further means responsive to a change of state of all the memory means for indicating the presence of more than one out of tolerance signal includes an OR gate in combination with a NAND gate.

6. A monitor system for a redundant system comprising an input for receiving a plurality of signals:
    plural level detection means for producing output signals as a result of instantaneous differences in amplitude between pairs of the input signals, each of said level detection means including a single ended difference amplifier providing an output signal proportional to the difference in amplitude between a pair of the input signals;
    each of said level detection means including an emitter follower providing impedance matching and a Schmitt trigger having an input operatively connected through the emitter follower to the output of the difference amplifier and effective for producing a change in state when its input exceeds a predetermined voltage level;
    plural memory means responsive to a change in said output signals, each of said plural memory means including an inverter for latching the level detection means upon producing an output signal as a result of instantaneous differences in amplitude between a pair of the input signals;
    redundant logic means responsive to a change of state of any said memory means for indicating an out of tolerance signal, each of said logic means including a multiple input NAND gate;
    and additional redundant logic means responsive to a change of state in all of the memory means for indicating the presence of more than one out of tolerance signal, each of said additional logic means including a multiple input OR gate in combination with a NAND gate.

7. A monitor system comprising an input for receiving a plurality of signals:
    plural means for producing an output signal as a result of instantaneous differences in amplitude between pairs of the input signals;
    plural memory means responsive to a change in said output signals;
    redundant logic means responsive to a change of any of said memory means for indicating an out of tolerance signal; and
    further redundant logic means responsive to a change of state in all of said memory means for indicating the presence of more than one out of tolerance signal.

References Cited by the Examiner

UNITED STATES PATENTS

| | | | |
|---|---|---|---|
| 869,728 | 10/1907 | Paisley | 340—376 |
| 3,228,002 | 1/1966 | Reines | 340—172 X |

NEIL C. READ, *Primary Examiner.*

D. K. MYER, *Assistant Examiner.*